United States Patent [19]

Lover

[11] 4,449,513
[45] May 22, 1984

[54] SOLAR HEATER
[76] Inventor: George Lover, 4773 Beach Ridge Rd., Lockport, N.Y. 14094
[21] Appl. No.: 519,681
[22] Filed: Aug. 2, 1983
[51] Int. Cl.³ .............................................. F24J 3/02
[52] U.S. Cl. .................................. 126/416; 126/438; 126/446
[58] Field of Search ............... 126/438, 446, 448, 450, 126/442, 416

[56] References Cited
U.S. PATENT DOCUMENTS
4,127,104 11/1978 Greene ................................ 126/438
4,306,544 12/1981 Clemens .............................. 126/450

FOREIGN PATENT DOCUMENTS
2486634 1/1982 France .................................. 126/438

Primary Examiner—Carroll B. Dority, Jr.
Attorney, Agent, or Firm—James J. Ralabate

[57] ABSTRACT

A solar heater having a housing having a base and back formed of insulation and a glass disposed between the base and back. A sheet metal plate in contact with the base and back. A heat absorbing conduit in the housing and in contact with the sheet metal plate.

20 Claims, 3 Drawing Figures

U.S. Patent May 22, 1984 4,449,513
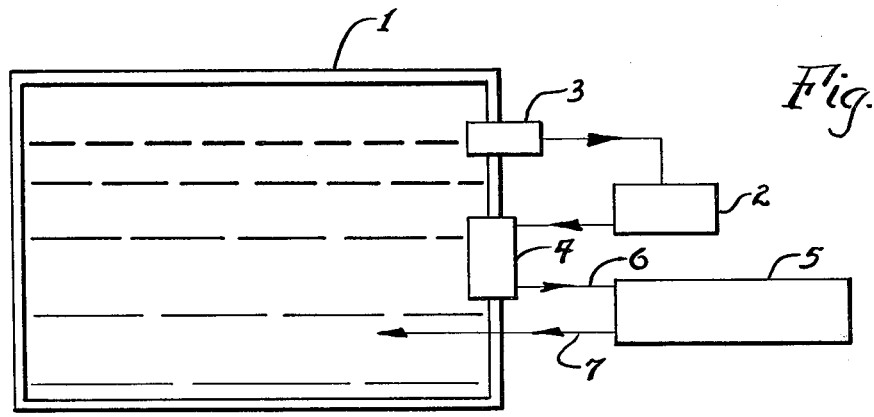
Fig. 1
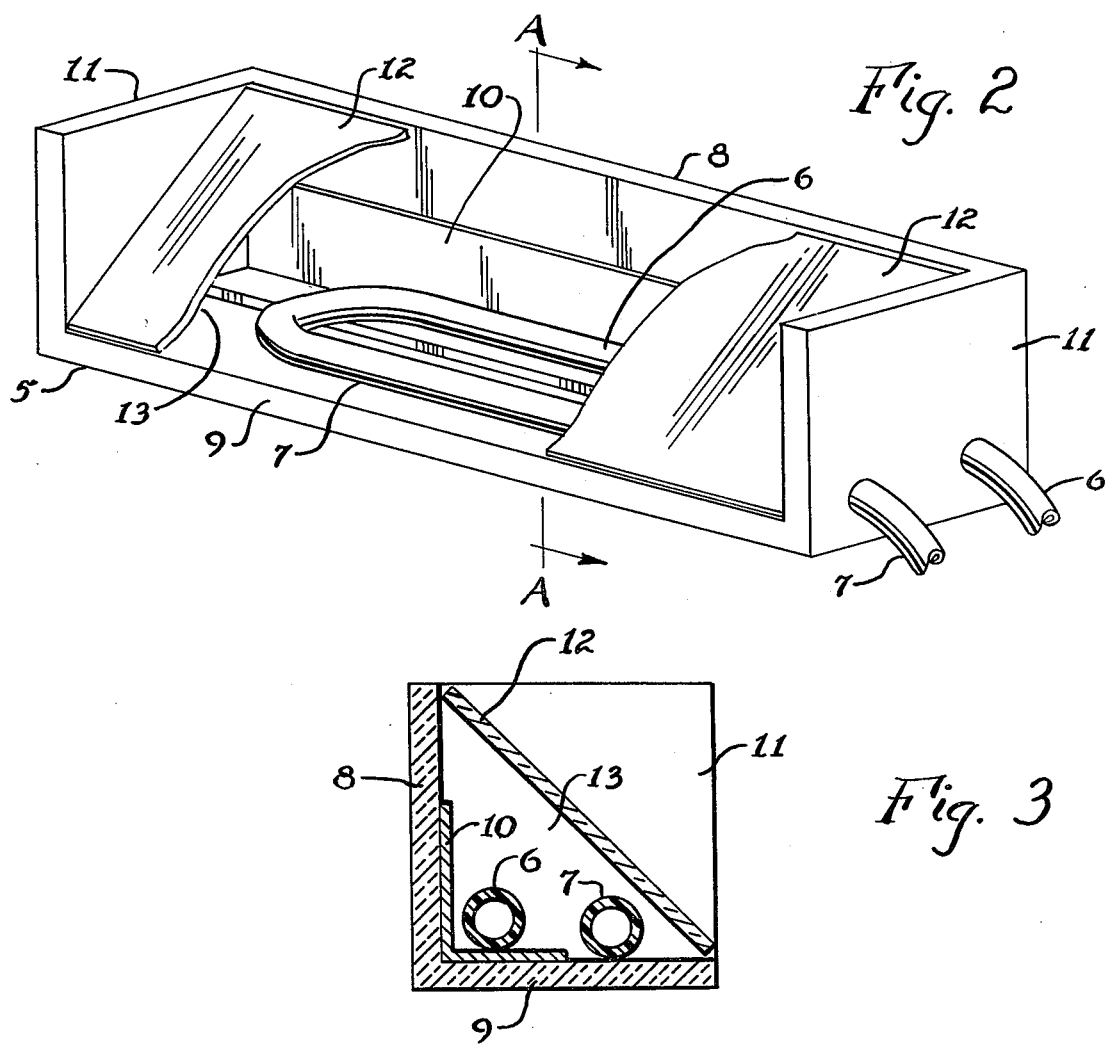
Fig. 2
Fig. 3

SOLAR HEATER

This application relates to a device for heating swimming pools, and, more specifically, to a solar heater particularly adapted for the efficient heating of a swimming pool.

BACKGROUND OF THE INVENTION

It is known to use various types of heating systems for swimming pools, both inground and above ground. The conventional method involves the use of a furnace or fuel heater that heats circulated water and directs it back into the pool. The use of these heaters to heat large amounts of water becomes expensive when used for any extended period of time. It is therefore desirable to discover more efficient and inexpensive ways to heat swimming pools. It is recognized that solar energy provides low cost heat for several varied applications. Use of solar heaters to maintain the temperatures of swimming pools at a relatively comfortable level are also known. Solar heaters for swimming pools are described in U.S. Pat. Nos. 31,161,193; 3,599,626; 3,686,694; 3,868,945 and 4,172,311. Generally, heaters of this type are permanently installed, complex units that are relatively expensive to install. Some of these prior art solar heaters are not fully insulated and thus lose internally collected heat energy. Others do not maximize the use of the sun's rays to convert to heat energy, and involve structures that cause or permit heat loss from the system. Additionally, known solar systems for swimming pools require additional apparatuses such as pumps and other equipment for them to function properly. One heater known for use with swimming pools circulates water through gussets, essentially heating pool water by outside air and some sun ray absorption because of charcoal impregnation of gusset material. They do not generate heat by wave length change.

While it is known to utilize solar energy for heating the water in swimming pools, none of the solar heaters have attained large scale success. Most known swimming pool solar heaters are not portable because of their excess weight and bulkiness. Other solar heaters are too complex for use in swimming pools, and they require extensive engineering knowledge to install. Most of the heretofore known solar swimming pool heaters are too expensive for the average user and require installation of additional devices for them to function properly.

SUMMARY OF THE INVENTION

It is therefore an object of this invention to provide a solar heater system for swimming pools that is devoid of the above-noted disadvantages.

Another object of this invention is to provide a portable, comparatively lightweight solar heater for swimming pools.

An additional object of this invention is to provide a solar heater for swimming pools that can be easily installed in proximity with and will function off existing swimming pool filter pumps.

Another further object of this invention is to provide a solar heater device and system for swimming pools that is relatively inexpensive while also being highly efficient.

Another further object of this invention is to provide a solar heater apparatus and system for swimming pool water that is very durable and requires little, if any, upkeep.

Still a further object of this invention is to provide a water heater for swimming pools that has a relatively high heating capacity and that permits easy adjustment of water flow rate through said heater.

Still a further object of this invention is to provide a process using a solar water heater for swimming pools that retains a large portion of the heat generated because of its high degree of insulation.

A yet further object of this invention is to provide a solar water heater that generates heat by converting the ultra violet rays of the sun to infrared rays.

These and additional objects are accomplished by this invention by providing a novel solar heater for swimming pools which comprises an elongated triangular shaped structure having a flat black-colored insulated bottom, back, and end portions. When black is mentioned in this disclosure, it is to be understood that substantially flat black paint or flat colorant is intended. The elongated diagonal face of said triangle comprises a glass surface which extends completely across said heater and connects the two insulated end portions thereby forming an elongated triangular housing. Therefore, the elongated triangular housing is made up of an insulated back vertical back side portion, an insulated base portion and said glass diagonal portion connecting said base and said vertical back side portion. Contained in said elongated triangular housing and extending longitudinally therethrough is a black colored pipe which contains the water to be heated and is in flow connection with the pool water and pool pump. Water is pumped into this pipe from the pool, through the solar heater, and out of the solar heater back into the pool. The pipe may be a one piece pipe, hose or tubing, or, alternatively, can comprise a rigid pipe portion in said elongated housing and flexible pipe or hose portions leading to and from said pool water. Also located in said housing and in contact with said base portion and said back side portion is an L-shaped galvanized plate through its entire length when in said housing. The water outlet pipe is connected to said inlet pipe (or alternatively is one continuous piece integral with said inlet pipe) and lays on top of the insulated base portion of said triangular housing. Alternatively, both the water inlet pipe and water outlet pipe may be in heat contact with said galvanized sheet metal plate.

The insulated vertical back, base and end portions of this solar heater are preferably made of cellular polystyrene, or polystyrene foam, but can be any suitable dark colored lightweight insulating material. The color will be referred to in this application as a black surface. Typical insulating materials are fiberglass, urea foams, house building board, wood, rubber foams, natural sponge, synthetic foams such as polystyrene, polyurethanes, polycarbonates, formaldehyde materials, or any other material having a high degree of insulation together with relatively light weight. It is preferred to use dark colored polystyrene foam because of its desirable insulating properties and physical strength. The insulated back, base and end portions of the solar heater give it its structural strength and provide sufficient strength to support the glass diagonal portion and the internally contained components. These insulated parts also retain the heat generated and significantly improve the efficiency of the solar heater. At the same time, we found polystyrene foam to be light weight, structurally sound and relatively inexpensive.

The inlet and outlet pipe portions both internal and external of the solar heater housing may be one continuous piece or a plurality of pieces depending upon the material available. It is preferred that the piping be black colored, but any dark color will function. The pipe portions carry the water to be heated and permit the pool water to flow from the pool pump outlet into the solar heater housing to be heated. After it is heated it flows through the water outlet pipe back into the pool as heated water. The black colored pipes absorb sun rays causing the contained water to be heated. The sun's rays passing through the diagonal glass surface cause the ultra violet portion of the rays to be converted to infrared rays. The heat energy given off by this transition is also absorbed by the black pipes thus giving a heating source in addition to the direct pipe heating by absorption of the direct sun's rays. The black surface of the pipes draws heat, absorbs it and improves significantly the heating of the water passing through these conduits. Any suitable material may be used for these pipes, typical materials are rubber, synthetic materials such as polymeric materials, both organic and inorganic. The preferred material is polyvinyl chloride (PVC) because of its desirable physical properties. It is also preferred that the pipe be colored black for additional heat absorption. This black hose or pipe can be one continuous length extending from connection to the filter pump outlet, through the solar heater housing, and back into the pool. This black hose can be flexible or not depending on the desired utility or result.

The glass diagonal plate that extends from end to end and connects the back portion to the base portion is used to convert the ultra violet portion of the sun's rays to infrared which in turn causes heat energy to be given off. When this wave length transition occurs, the energy is given off as heat and causes the water to be heated in the pipes. The solar heater is positioned in a location where the glass surface will face the sun for the maximum period of time. Usually, it is located where it will face the sun from about noon time to about 6:00 p.m. It is preferred to use Plexiglass as the diagonal glass pane or plate because of its strength and safety features. Plexiglass is a lightweight thermoplastic polymer of methyl methachrylate and is resistant to weathering. The thickness of the glass will vary depending upon the desired results. However, any suitable single layer glass material may be used for this glass plate.

The sheet metal plate used is L-shaped and contacts the connecting portions of vertical back section and the base section of the internal housing. The sheet metal plate is preferred to be a galvanized sheet metal plate which will retain the heat within the heater housing; however, any suitable reflective plate may be used. It also reflects the sun's rays and provides excellent heat distribution throughout the length of the housing. Since the inlet tube or pipe rests on the galvanized sheet metal plate, it conducts heat through the pipe and assists together with the sun's rays in heating the water flowing through the pipes. The sheet metal plate also lends structural strength to the solar heater and maintains the cellular polystyrene portions in position. The pipe conduit leading from the solar heater to the pool can be adjusted in height thereby altering to the extent desired the water flow through the system. The temperature change effected by the heater of this invention, of course, will vary depending upon the sun's intensity, temperature, wind and other conditions, however, generally will heat the pool water to a temperature increase of from about 3 to 8 degrees F. The components such as the pipes or insulation are preferably provided with a flat black surface, painting or coating, to enhance their black body radiation absorption characteristics and minimizing back-reflection of radiation or rays in contact therewith. The sheet metal plate, however, requires a glossy metallic surface to reflect rays and for heat distribution throughout the heater.

Preferred Embodiments of the Invention

The following examples and drawing description illustrate preferred embodiments of this invention.

Example I

The swimming pool solar heater of this invention is designed to be low cost and energy efficient. Generally, the basic principle of this device is to utilize sunlight; specifically, ultra violet light passing through said diagonal glass face is changed to infrared light which gives off heat. This heat is used to warm pool water flowing through black pipes in the insulated closed container or housing.

The shape of the housing or container is triangular formed by the diagonal glass face, the vertical back and the base portion. The base is flat black painted insulating material such as polystyrene foam, and in one embodiment it was 15 feet 6 inches long, 12.5 inches wide, and 2 inches thick. The back is flat black painted (at least on its interior surface) insulating material such as polystyrene, and in an embodiment was 15 feet 6 inches long, 12 inches high, and 2 inches thick. The third triangular side or diagonal face is glass, preferably Plexiglass 1/16 inch thick, 15 inches wide and 15 feet 3 inches long.

Each end portion on at least its interior survace is black polystyrene foam, 2 inches thick. 12.5 inches long, 12 inches high, and grooved 0.5 inch deep and angled for the Plexiglass. The galvanized sheet metal plate is 15 feet long, and formed 2.5 inches high and 2.5 inches wide is placed at the back of base of flat black polystyrene foam for support and heat retention and secured with stainless screws 2¼ inches long.

The black inlet PVC pipe is 1½ inches in diameter by 15 feet long, and lays on the galvanized sheet metal. The second black outlet PVC pipe is 1½ inches diameter by 15 feet long, and lays on top of the flat black base cellular polysytrene. If two or more separate pipe sections are used, these are connected by flexible hose and adjustable band clamps. The Plexiglass is held in place by shaped polystyrene molding secured with 3 inch aluminum screws.

The black PVC pipe of the solar heater is connected to the pool water by 40 feet of swimming pool vacuum dark-colored hose; 20 feet for the inlet to the solar heater and 20 feet for the outlet of the solar heater. The inlet of the solar heater is connected to the outlet of the return of the pump filter system of the swimming pool. The outlet vacuum hose of the solar heater is placed in the swimming pool water. The ideal flow rate of water through the solar heater is to obtain a two degree F. increase in temperature of the heated water coming out of the solar heater; see Example V. The only power used to move the pool water through the solar heater is the pump of the filter system of the swimming pool, which is already necessary for normal pool operations.

Example II

The solar heater described in Example I was used for all of the below data. Temperatures of the water in the pool were measured at several different locations to obtain a true water average reading.

Turning the solar heater off on sunny days in order to obtain normal temperature changes in the pool water (without the use of device of this invention) resulted in water temperature increases of up to about 3° F. On days having similar weather conditions when air temperature changes caused pool water temperatures to increase about 3° F. the solar heater caused pool water temperature changes up to about 6° F. Using this as a standard, the heating effect of the solar heater was recorded as follows on separate days:

| Day | 7:30 a.m. Pool Temperature | 6:00 p.m. Air Temperature | 6:00 p.m. Pool Water Temperature | Weather Conditions |
| --- | --- | --- | --- | --- |
| 1 | 69° F. | 82° F. | 75° F. | Sunny |
| 2 | 72° F. | 86° F. | 77° F. | Hazy sun |
| 3 | 74° F. | 85° F. | 80° F. | Hazy sun |
| 4 | 77° F. | 82° F. | 81° F. | Partly cloudy |
| 5 | 77° F. | 84° F. | 82° F. | Sunny |
| 6 | 78° F. | 77° F. | 79° F. | Cloudy |
| 7 | 77° F. | 81° F. | 79° F. | Partly sunny |
| 8 | 75° F. | 80° F. | 79° F. | Mostly sunny |
| 9 | 75° F. | 80° F. | 79° F. | Mostly sunny |
| 10 | 76° F. | 83° F. | 81° F. | Sunny |
| 11 | 77° F. | 82° F. | 82° F. | Sunny |
| 12 | 77° F. | 83° F. | 82° F. | Sunny |
| 13 | 77° F. | 81° F. | 81° F. | Sunny |
| 14 | 76° F. | 74° F. | 78° F. | Partly Sunny |
| 15 | 74° F. | 83° F. | 77° F. | Cloudy |
| 16 | 75° F. | 70° F. | 77° F. | Cloudy |
| 17 | 73° F. | 66° F. | 73° F. | Cloudy |
| *18 | 69° F. | 76° F. | 72° F. | Sunny |
| 19 | 69° F. | 81° F. | 75° F. | Sunny |
| 20 | 72° F. | 87° F. | 78° F. | Sunny |
| 21 | 75° F. | 84° F. | 81° F. | Mostly sunny |
| 22 | 78° F. | 90° F. | 84° F. | Sunny |
| 23 | 80° F. | 90° F. | 84° F. | Sunny |
| 24 | 79° F. | 65° F. | 80° F. | Cloudy |
| 25 | 73° F. | 68° F. | 75° F. | Sunny |
| 26 | 70° F. | 69° F. | 75° F. | Partly sunny |
| 27 | 71° F. | 76° F. | 74° F. | Cloudy |
| 28 | 71° F. | 75° F. | 76° F. | Sunny |
| 29 | 71° F. | 76° F. | 76° F. | Sunny |
| 30 | 71° F. | 80° F. | 76° F. | Sunny |

*Solar heater disconnected with ideal weather conditions such as bright sunshine, no wind, and moderate temperatures.

Example III

Heater Installation

The solar heater was placed where glass plate will face the sun from noon until 6:00 p.m. The 40 feet of vac hose used will allow the positioning of the heater on the pool deck or on the ground. No additional pump or power source is needed, only the pump filter system of the pool is used. The solar heater is connected to the filter return hose or return connection of the pool. A 6 inch length of black PVC pipe with holes is placed between the solar heater vac hose and pool filter return hose or return connection. The return vac hose is placed from solar heater in pool next to in-pool ladder. Obtain a flow rate of water through the solar heater by checking at the outlet of the return vac hose. The flow rate should be about 3.75 gallons per minute or about 1.0 quart per 4 seconds. To obtain a flow rate fill a 1.0 quart container with water from the outlet vac hose of the solar heater using a watch. In 4.0 sec. the flow rate should approximate the above value. To decrease flow rate, raise outlet vac hose of solar heater to desired height. Also it may be necessary to drill more holes in 6 inch black PVC pipe connected to filter system return outlet. To increase flow rate, lower outlet vac hose of solar heater. With the above drilled holes the filter pump pressure of the pool should be about the same as it was before connecting the solar heater. When the pool water gets too warm, disconnect the wolar heater at the filter pump return outlet of the pool. Vacuuming, backwashing, and all normal pool operations can be carried out with or without solar heater connected.

Example IV

The following procedure was conducted to measure flow rate against temperature rise.

| Conditions | Pool Temperature 81° F. Pool cover off Hazy sunshine Time of Test 2:30 p.m.–4:00 p.m. |
| --- | --- |
| Flow Rate | Time to fill 1.0 quart container with water coming out of solar heater. |

| Flow Rate | Temperature Rise °F. (Water coming out of heater) |
| --- | --- |
| 4 sec. | 2° F. |
| 6 sec. | 2° F. |
| 8 sec. | 2° F. |
| 10 sec. | 2° F. |
| 12 sec. | 4° F. |
| 14 sec. | 4° F. |
| 16 sec. | 5° F. |
| 28 sec. | 7° F. |

Water flow rate coming out of solar heater was adjusted to 10 seconds.

Then the pump was turned off for 15 minutes. When turned on, the water coming out of the solar heater was 108° F. for 2.0 minutes.

After 10 minutes, the water coming out of the solar heater returned to 83° F., which is the temperature rise for a flow rate of 10 seconds.

Example V

The following two tests were conducted to determine pool temperature increase at a fixed flow rate:

| (A) | Conditions | Date July 2, 1983 7:30 a.m. pool temperature 75° F. Pool cover off Bright sunshine Time of Test 10:00 a.m.–7:00 p.m. Flow rate = 16 seconds |
| --- | --- | --- |
| | Results | Water temperature increase out of heater = 5°. Volume pool water through heater = 576 gallons. Temperature increase for entire pool water for the day = 6° F. |
| (B) | Conditions | Date July 3, 1983 7:00 a.m. pool temperature 78° F. Remaining conditions same as (A) above. |
| | Results | Water temperature, increase out of heater = 5° F. Volume pool water through heater = 576 gallons. Temperature increase for entire pool water for the day = 6° F. Volume of pool water through solar heater divided by the total volume of pool. |

$$\frac{576 \text{ gallons}}{6500 \text{ gallons}} = 8.9\%$$

9.0 hours/flow rate 16 seconds

Other features and applications of the present invention will be made apparent by the following detailed description of the preferred embodiment of the invention.

FIG. I is a plan view of the present solar heater in relation to the other components of a conventional swimming pool.

FIG. II is a perspective view of a preferred embodiment of the solar heater of this invention.

FIG. III is a cross-sectional elevation view of the solar heater of this invention, taken along line A—A of FIG. II.

In FIG. I a swimming pool 1 either above ground or in ground usually contains a unit 2 comprising a filter and a filter pump, a skimmer with a weir door 3 and a return outlet 4. The solar heater 5 of this invention is flow connected to pump outlet means 4 for a source of pool water by means of water inlet tube 6. After the water passes through solar heater 5, the resulting heated water is passed into the pool via water outlet conduit 7. An important feature of this invention is that the solar heater can be easily installed within the framework of existing pool components, without the need of a special pump or other equipment. Also, after installation the solar heater of this invention does not interfere with the proper functioning of the pool system and components. The water inlet 6 and the water outlet conduit 7 may be a one-piece hose or tube or pipe that is flexible. Alternatively, inlet conduit 6 can be one piece, and can be connected to outlet conduit 7 by any suitable connector means. The inlet and outlet conduits 6 and 7 can enter or exit solar heater 5 at any suitable location in the heater such as front, back, bottom etc.

In FIG. II, the elongated triangular shaped solar heater 5 of this invention is illustrated. The heater 5 comprises a vertical back portion 8 that is constructed of an insulating material such as cellular polystyrene. The surface of this back portion 8 is painted flat black or otherwise colored flat black to increase its heat absorption properties. The base 9 of the heater is made of the same material as back portion 8 and also is colored flat black for the same reasons. Overlying base 9 and in angular contact with back portion 8 is a galvanized sheet metal plate 10 which has a substantially L-shaped configuration. The plate 10 retains the heat generated internally, reflects sun's rays, provides substantially even heat distribution and increases the structural stability of the heater 5. On the outer terminal end portions of heater 5 are insulated end portions 11 that are constructed of the same insulating material as back portion 8 and base portion 9.

The interior of end portions 11 are also colored flat black for the same physical property reasons as discussed in relation to back and base portions 8 and 9 respectively. While the drawing shows end portions 11 to be rectangular in configuration, they can also be any configuration such as rectangular to conform to the shape of glass surface 12 which rests upon end portions 11. Glass plate or surface 12 permits the sun's rays to penetrate therethrough and converts the ultra violet portion of the ray to infrared. When this conversion takes place, heat energy is given off and retained in heat exchange housing 13. This heat assists in providing the heat necessary to heat water inlet conduit 6. Inlet conduit pipe or tube 6 rests on plate 10 and is heated in part by conduction of heat from plate 10. Inlet conduit 6 is also heated by the heat conversion energy discussed above and by direct contact with the sun's rays that penetrate through glass diagonal plate 12. The water thus is pumped from the pool via filter pump 2 and enters the heater through conduit 6. It is heated in heat exchanger or solar heater housing 13 and passes out of the heater via outlet conduit 7. The solar heater 5 as illustrated is lightweight, portable, simple in construction, efficient and relatively inexpensive to manufacture and install.

FIG. III shows a cross-sectional view of heater 5 taken along line A-A from FIG. II. End piece 11 is shown as being substantially rectangular in configuration, but may be of any suitable configuration such as triangular, if desired. It is made of an insulating material and is preferably colored flat black on at least its interior surface.

Bisecting end piece 11 in a diagonal manner is glass plate 12 which extends diagonally from the upper to lower corners of the heater 5. The glass plate 12 extends longitudinally across the heater 5 as shown in FIG. II. The glass surface faces the sun and permits the solar rays to penetrate into the interior 13 of the heater 5. Extending through the entire back portion and base portion of the heater 5 are insulating elements back portion 8 and base portion 9. These portions are also colored flat black for thermal property reasons. Connected to back portion 8 and base portion 9 is a galvanized plate 10 which has a reflective surface and provides both heat distribution and structural strength to the heater 5. On the lower exposed face of plate 10 and in heat contact therewith rests water inlet conduit 6. The water contained in conduit 6 is heated and pumped via filter pump 2 (of FIG. I) through heater 5 to outlet conduit 7 to any location in the interior of swimming pool 1. The glass panel 12 is preferably made from methyl methachrylate plastic and sold under the trademark Plexiglass. The weight of the entire heater 5 is substantially less than about 50 pounds and is easily transported from one location to another if desired.

Other modifications and ramifications of the present invention will occur to those skilled in the art upon a reading of this disclosure; these are to be considered to be within the spirit and scope of this invention.

What is claimed is:

1. A solar heater for swimming pool water comprising a heat exchange housing, water inlet means, and water outlet means, said housing elements comprising insulated end portions, an insulating back portion, an insulating base portion, and a diagonally disposed glass facing, said elements forming an elongated triangular structure, positioned within said housing is sheet metal plate in contact with said back portion and said base portion, positioned on and in heat contact with said metal plate is at least one of said water inlet and outlet means, said water outlet means continuous with said inlet means and adapted to permit water flow into it from said inlet means.

2. The solar heater of claim 1 wherein said water inlet means and said water outlet means are made from a heat absorbing material.

3. The solar heater of claim 1 wherein said insulated portions are made from a heat retaining material.

4. The solar heater of claim 1 wherein said sheet metal plate has a reflective surface and has an L-like configuration.

5. The solar heater of claim 1 wherein said inlet and said outlet means are continuous and comprise a one piece flow structure.

6. The solar heater of claim 1 wherein said end portions are rectangular in configuration.

7. The solar heater of claim 1 wherein said glass facing is adapted to permit penetration of sun's rays therethrough and allow heating thereby of said water containing inlet means.

8. The solar heater of claim 1 wherein said water outlet means is adjacent to and in contact with said insulating base portion.

9. The solar heater of claim 1 wherein said water inlet means rests in said housing and in contact with said sheet metal plate.

10. A solar heater adapted to be connected in water flow contact with a filter pump of a swimming pool comprising an elongated triangular housing, insulating end portions, water inlet conduit means and water outlet conduit means, said housing comprising a metal plate and a triangular framework made up of an insulating back portion, an insulating base portion, and a diagonally disposed glass plate, said metal plate in contact with said back portion and said base portion at their junction point, said glass plate adapted to permit sun's rays passing therethrough to contact at least one of said water inlet and said water outlet conduits, at least one of said conduits resting on and in heat contact with said metal plate, said water outlet conduit means coextensive with said inlet conduit and adapted to permit water flow into it from said inlet means.

11. The solar heater of claim 10 wherein both said inlet conduit means and said outlet conduit means are in heat contact with said metal plate.

12. The solar heater of claim 10 wherein said water inlet conduit means is in heat contact with said metal plate.

13. The solar heater of claim 10 wherein said conduits extend longitudinally across substantially the length of said heater housing and are adapted to permit water to continuously flow therethrough.

14. The solar heater of claim 10 wherein said housing components are made from a heat retaining material.

15. The solar heater of claim 10 wherein said housing components are constructed from a heat retaining material, and said conduits are constructed from dark colored heat absorbing materials.

16. The solar heater of claim 10 wherein said metal plate is substantially L-shaped and extends in vertical contact with said back portion and in horizontal contact with said base portion.

17. The solar heater of claim 10 wherein said water inlet conduit is in flow contact with a pump, and said water outlet conduit is in flow contact with said inlet conduit, said outlet conduit extending from said solar heater to a point in flow contact with a receiving receptacle.

18. The solar heater of claim 10 wherein said insulated end portions are rectangular in configuration.

19. The solar heater of claim 10 wherein said insulated end portions are triangular in configuration.

20. The solar heater of claim 10 wherein said metal plate, inlet conduit and outlet conduit are all coextensive with and located at least in part in the internal portion of said heater housing.

* * * * *